United States Patent
Wei

(10) Patent No.: US 8,085,474 B2
(45) Date of Patent: Dec. 27, 2011

(54) ZOOM LENS

(75) Inventor: Lai Wei, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 121 days.

(21) Appl. No.: 12/512,180

(22) Filed: Jul. 30, 2009

(65) Prior Publication Data

US 2010/0039710 A1    Feb. 18, 2010

(30) Foreign Application Priority Data

Aug. 13, 2008    (JP) ................... 2008-208490

(51) Int. Cl.
G02B 15/14    (2006.01)

(52) U.S. Cl. ....................... 359/680; 359/676

(58) Field of Classification Search .......... 359/680–682, 359/691, 676
See application file for complete search history.

(56) References Cited

U.S. PATENT DOCUMENTS

| | | | | |
|---|---|---|---|---|
| 6,268,964 B1 * | 7/2001 | Ozaki et al. | ................... | 359/685 |
| 6,924,947 B2 * | 8/2005 | Saori | ................ | 359/749 |
| 6,989,941 B2 * | 1/2006 | Tomioka | ................ | 359/680 |
| 7,046,454 B2 | 5/2006 | Tomioka | | |
| 7,548,380 B2 | 6/2009 | Jeong | | |

FOREIGN PATENT DOCUMENTS

| | | | |
|---|---|---|---|
| JP | 05011182 A | * | 1/1993 |
| JP | 8-320435 A | | 12/1996 |
| JP | 3600870 B | | 10/2004 |
| JP | 2004-317901 A | | 11/2004 |
| JP | 2008-129608 (A) | | 6/2008 |

* cited by examiner

*Primary Examiner* — James Greece
(74) *Attorney, Agent, or Firm* — Foley & Lardner LLP

(57) ABSTRACT

A zoom lens includes, sequentially from an object side, a first lens group having a negative refractive power; and a second lens group having a positive refractive power, where focal length is varied by changing a distance between the first lens group and the second lens group, and a first conditional expression $0.8<|f_1/f_2|<1.0$ is satisfied, $f_1$ being the focal length of the first lens group and $f_2$ being the focal length of the second lens group.

5 Claims, 6 Drawing Sheets

ZOOM LENS

BACKGROUND OF THE INVENTION

1. Field of the Invention

The present invention relates to a zoom lens.

2. Description of the Related Art

In recent years, various types of electronic imaging apparatuses have become widespread. A majority of such electronic imaging apparatuses include a zoom lens as an imaging lens. Size reductions of recent electronic imaging apparatuses together with further size reductions of the zoom lenses continue to be demanded and to meet these demands, many compact zoom lenses have been proposed.

In particular, monitoring cameras used for closed circuit television (CCTV) use visible light during the day and near infrared light at night. Thus, compact zoom lenses capable of handling a spectrum from visible light to near infrared light have been proposed as monitoring camera lenses (see, for example, Japanese Patent No. 3600870 and Japanese Patent Application Laid-Open Publication No. 2004-317901).

Wide angle, large diameter zoom lenses capable of monitoring a wider area in a dimly lit area are preferable as monitoring camera lenses. Further, increases in the number of megapixels of imaging elements (CCDs, CMOSs, etc.) has progressed and in terms of capturing even finer characteristics of an object, that is to say, with respect to a lens capable of handling higher megapixels, expectations are high. Moreover, demand is increasing for zoom lenses that are more compact and applicable for use with compact, monitoring-use dome cameras that have come into widespread use.

Meanwhile, to capture even finer characteristics of an object, lenses for megapixel imaging apparatuses must sufficiently correct various aberrations occurring near the image plane.

Although the zoom lenses disclosed in Japanese Patent No. 3600870 and Japanese Patent Application Laid-Open Publication No. 2004-317901 are able to handle megapixel imaging elements to a certain degree, with respect to various type of aberration, such as longitudinal chromatic aberration and spherical aberration, correction is difficult. Hence, the lenses are not suitable for use with megapixel imaging apparatuses.

SUMMARY OF THE INVENTION

It is an object of the present invention to at least solve the above problems in the conventional technologies.

A zoom lens according to one aspect of the present invention includes, sequentially from an object side, a first lens group having a negative refractive power; and a second lens group having a positive refractive power, where focal length is varied by changing a distance between the first lens group and the second lens group, and a first conditional expression $0.8<|f_1/f_2|<1.0$. is satisfied, $f_1$ being the focal length of the first lens group and $f_2$ being the focal length of the second lens group.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Figure 1:
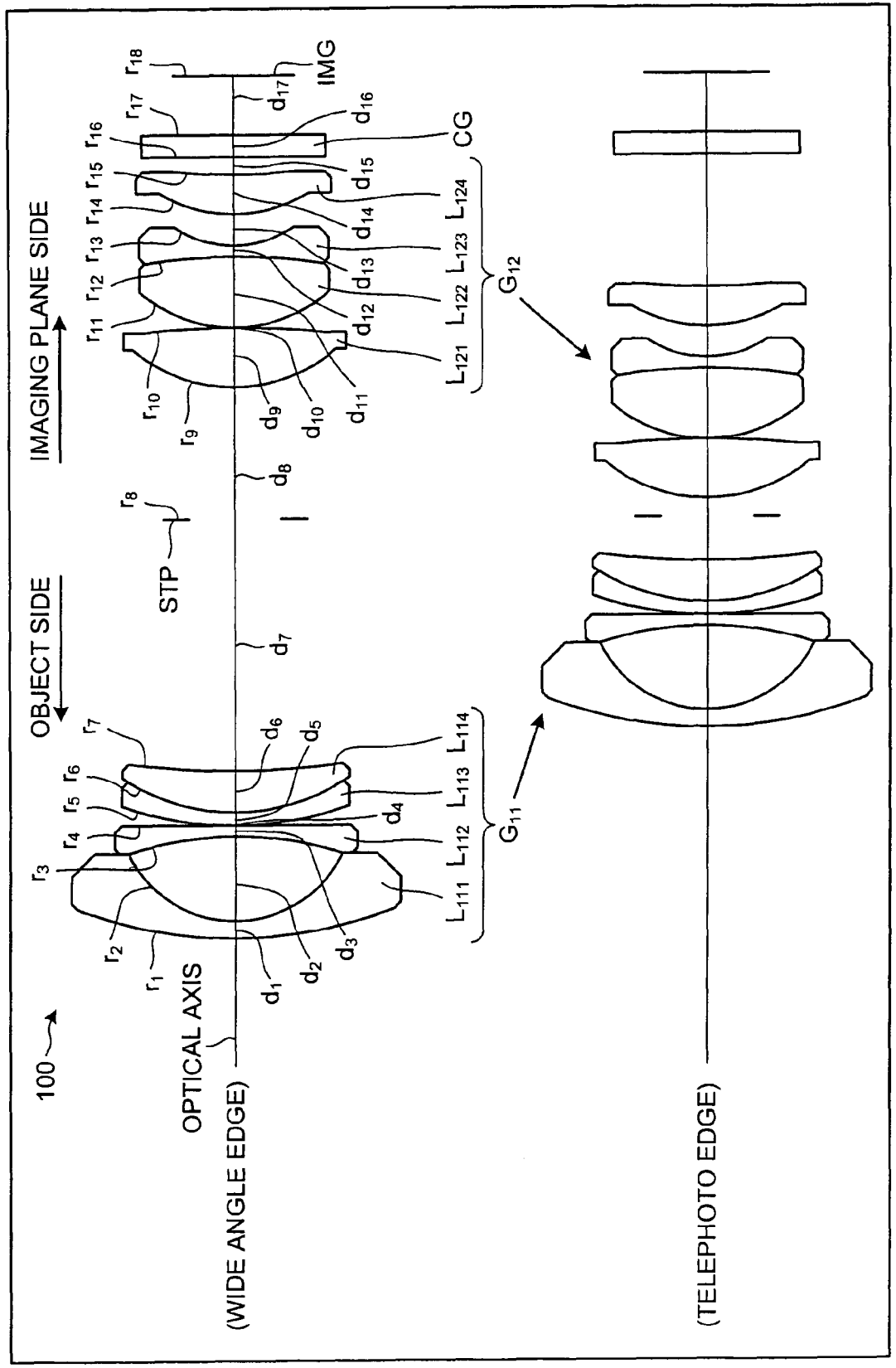
FIG. 1 is a side view, along the optical axis, of a zoom lens according to a first example.

Referring to the accompanying drawings, exemplary embodiments according to the present invention are explained in detail below.

A zoom lens according to an embodiment of the present invention includes, sequentially from an object side, a first lens group having a negative refractive power and a second lens group having a positive refractive power. The zoom lens varies focal length by changing the distance between the first lens group and the second lens group. Further, focusing is performed by moving the first lens group along the optical axis.

Preferably, the zoom lens according to the embodiment satisfies the following conditional expression, thereby achieving compactness, wide angle imaging, and increased diameter of the lens.

$$0.8<|f_1/f_2|<1.0 \quad (1)$$

Where, $f_1$ is the focal length of the first lens group and $f_2$ is the focal length of the second lens group.

Conditional expression 1 specifies the ratio of the focal length $f_1$ of the first lens group and the focal length $f_2$ of the second lens group. Satisfying conditional expression 1 enables appropriate specification of power distribution of the first and the second lens groups and facilitates compactness, wide angle imaging, and increased diameter of the lens. If the lower limit of conditional expression 1 is exceeded, the positive refractive power of the second lens group becomes too weak causing the second lens to have to be moved a greater distance during magnification, thereby making reductions in the size of the optical system difficult. On the other hand, if the upper limit of conditional expression 1 is exceeded, the negative refractive power of the first lens groups becomes weak making wide angle imaging difficult and since the positive refractive power of the second lens group becomes strong, the resulting spherical aberration is beyond correction.

Furthermore, for applicability to megapixel imaging elements, the zoom lens according to the embodiment sufficiently corrects various aberrations occurring near the image plane.

Thus, the second lens group of the zoom lens includes, sequentially from the object side, a first lens, a second lens, a third lens, and a fourth lens, where the first lens and the fourth lens are positive lenses and have at least one surface that is aspheric; thereby, enabling more effective correction of spherical aberration, comatic aberration, astigmatism, etc.

The second lens group of the zoom lens includes a second lens that is positive and a third lens that is negative and preferably, the second and the third lenses are cemented together; thereby, enabling sufficient correction of longitudinal chromatic aberration occurring at the second lens group.

In addition, preferably, the zoom lens satisfies the following conditional expression.

$$\upsilon d_{22} > 68 \quad (2)$$

Where, $\upsilon d_{22}$ is the Abbe number with respect to the d-line of the second lens of the second group.

Satisfying conditional expression 2, i.e., by forming the second lens of the second lens group of a low dispersion material that allows conditional expression 2 to be satisfied, enables sufficient correction of longitudinal chromatic aberration at the second lens group and maintenance of excellent optical performance throughout the spectrum from visible light to near infrared light. If the lower limit of conditional expression 2 is exceeded, correction of longitudinal chromatic aberration becomes difficult and sufficient optical performance in the spectrum from visible light to near infrared light cannot be maintained.

The first lens group of the zoom lens includes, sequentially from the object side, a first lens that is a negative meniscus lens, a second lens that is negative, a third lens that is negative, and a fourth lens that is positive and preferably, the third lens and the fourth lens are cemented together; thereby, enabling sufficient correction of longitudinal chromatic aberration occurring at the first lens group and maintenance of excellent optical performance throughout the spectrum from visible light to near infrared light.

Preferably, chromatic aberration is corrected according to each lens group to maintain sufficient optical performance in the zoom lens.

Thus, preferably, the zoom lens satisfies the following expression.

$$\upsilon d_{14} < 25 \quad (3)$$

Where, $\upsilon d_{14}$ is the Abbe number with respect to the d-line of the fourth lens of the first lens group.

Satisfying conditional expression 3, i.e., by forming the fourth lens of the first lens group of a low dispersion material that allows conditional expression 3 to be satisfied, enables chromatic aberration occurring at the first lens group to be suppressed and chromatic aberration to be corrected more effectively. More specifically, satisfying conditional expression 3 enables overall correction of chromatic aberration occurring at the first lens group as a consequence of causing the longitudinal chromatic aberration and chromatic difference of magnification occurring at the fourth lens (positive lens) of the first lens group to be of the same amount and in the opposite direction of the longitudinal chromatic aberration and chromatic difference of magnification that occur at the negative lenses included in the first lens group. If the upper limit of conditional expression 3 is exceeded, the amount of chromatic aberration required for compensation cannot be generated at the fourth lens of the first lens group and as a result, the chromatic aberration occurring at the first lens group becomes difficult to correct.

Preferably, the zoom lens satisfies the following expression.

$$\upsilon d_{23} < 25 \quad (4)$$

Where, $\upsilon d_{23}$ is the Abbe number with respect to the d-line of the third lens of the second lens group.

Satisfying conditional expression 4, i.e., forming the third lens of the second lens group of a low dispersion material that allows conditional expression 4 to be satisfied, enables chromatic aberration occurring at the second lens group to be suppressed and chromatic aberration to be corrected more effectively. More specifically, satisfying conditional expression 4 enables overall correction of chromatic aberration occurring at the second lens group as a consequence of causing the longitudinal chromatic aberration and chromatic difference of magnification occurring at the third lens (negative lens) of the second lens group to be of the same amount and in the opposite direction of the longitudinal chromatic aberration and chromatic difference of magnification that occur at the positive lenses included in the second lens group. If the upper limit of conditional expression 4 is exceeded, the amount of chromatic aberration required for compensation cannot be generated at the third lens of the second lens group, and as a result, chromatic aberration occurring at the second lens group becomes difficult to correct.

The zoom lens performs magnification from a wide angle edge to a telephoto edge by moving the second lens group along the optical axis toward the object side and performs magnification and image plane correction by moving the first lens group along the optical axis toward the image side. Thus, during magnification, the respective lens groups are not protracted; thereby, enabling the zoom lens to be compact.

As explained, the zoom lens according to the embodiment has the characteristics described above enabling the zoom lens to be compact and to have a wide angle, a large diameter as well as high optical performance capable of coping with megapixel imaging elements. The zoom lens is an optimal lens for monitoring cameras performing approximately 3-fold magnification. Further, the zoom lens includes a lens having a suitable aspheric surface, thereby enabling effective correction of various types of aberration using a small number of lens as well as enabling reductions in the size, weight, and manufacturing cost of the zoom lens.

FIG. 1 is a side view, along the optical axis, of a zoom lens according to a first example. A zoom lens 100 includes, sequentially from the object side (not depicted), a first lens group $G_{11}$ having a negative refractive power and a second lens group $G_{12}$ having a positive refractive power. Between the first lens group $G_{11}$ and the second lens group $G_{12}$, a diaphragm STP is disposed. Between the second lens group $G_{12}$ and an image plane IMG, a cover glass CG is disposed. At the image plane IMG, the light receiving aspect of an imaging element, such as a CCD and a CMOS, is disposed.

The zoom lens 100 performs magnification from a wide angle edge to a telephoto edge by moving the second lens group $G_{12}$ along the optical axis toward the object side and performs magnification and image plane correction by moving the first lens group $G_{11}$ along the optical axis toward the image plane IMG side. Further, focusing is performed by moving the first lens group $G_{11}$ along the optical axis.

The first lens group $G_{11}$ includes, sequentially from the object side, a first lens $L_{111}$ that is a negative meniscus lens, a second lens $L_{112}$ that is negative, a third $L_{113}$ lens that is negative, and a fourth $L_{114}$ lens that is positive, where the third lens $L_{113}$ and the fourth $L_{114}$ lens are cemented together.

The second lens group $G_{12}$ includes, sequentially from the object side, a first lens $L_{121}$ that is positive, a second lens $L_{122}$ that is positive, a third lens $L_{123}$ that is negative, and a fourth lens $L_{124}$ that is positive. Both surfaces of the first lens $L_{121}$ are aspheric. The second lens $L_{122}$ and the third lens $L_{123}$ are cemented together. Further, both surfaces of the fourth lens $L_{124}$ are aspheric.

Various numeric data for the zoom lens according to the first example will be described herein.

focal length (f)=3.10 mm (wide angle edge) to 8.65 mm (telephoto edge)

Figure 2:
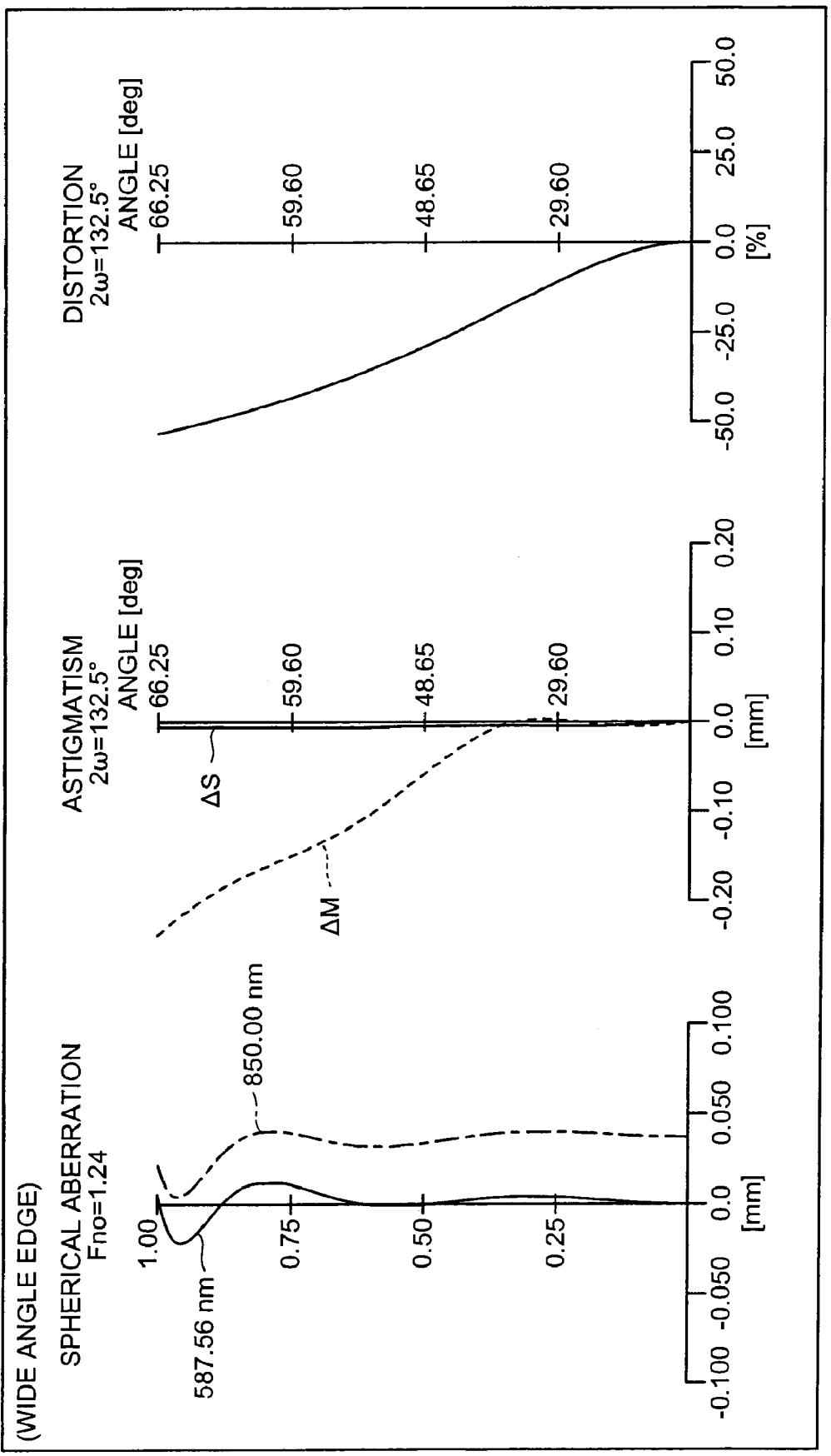
FIG. 2 is a schematic of spherical aberration, astigmatism, and distortion at the wide angle edge of the zoom lens according to the first example.
Figure 3:
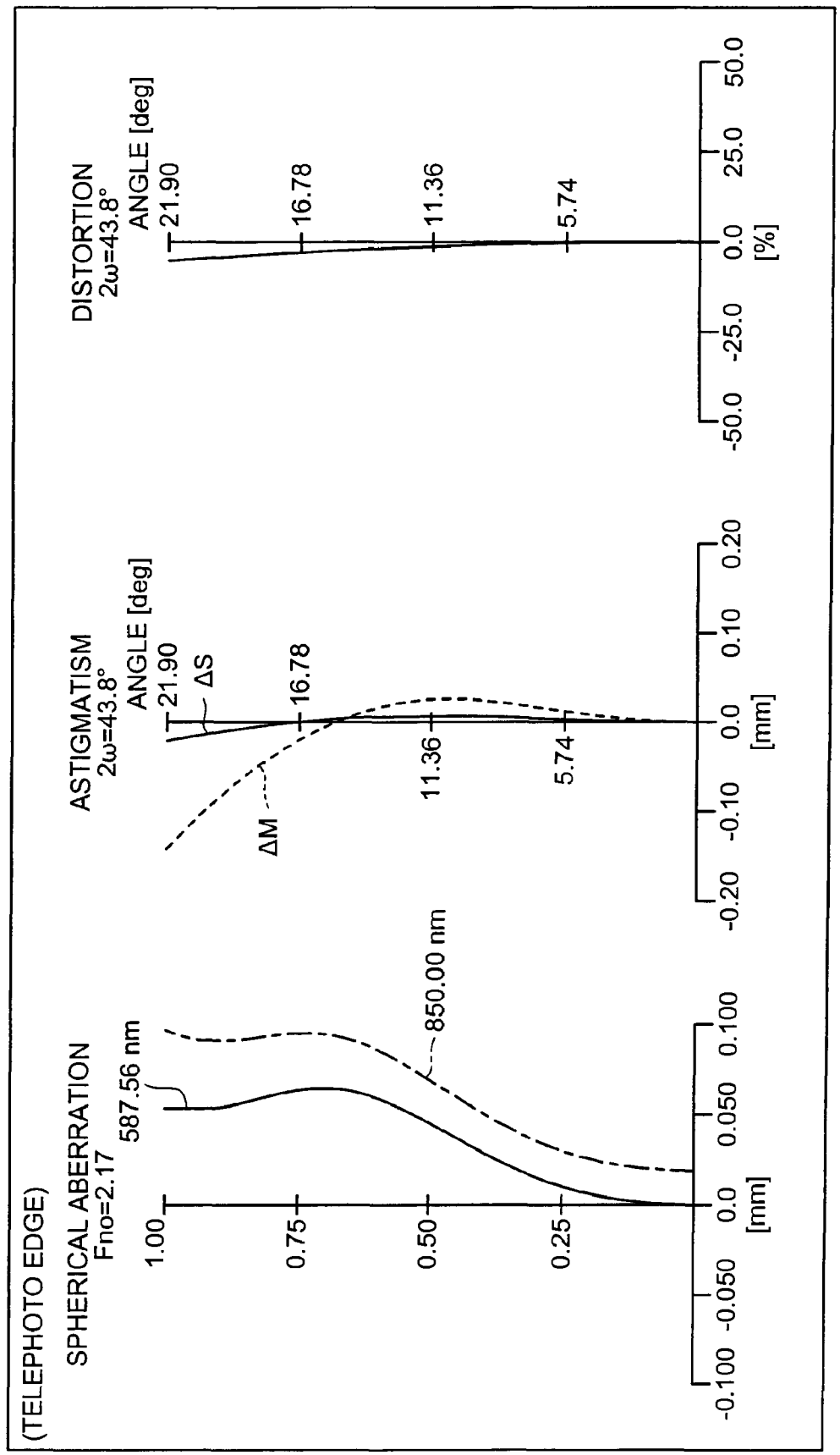
FIG. 3 is a schematic of spherical aberration, astigmatism, and distortion at the telephoto edge of the zoom lens according to the first example.

F number=1.24 (wide angle edge) to 2.17 (telephoto edge)

angle of view (2ω)=132.5° (wide angle edge) to 43.8° (telephoto edge)
(Values for Conditional Expression 1)
focal length ($f_1$) of first lens group $G_{11}$=−8.247 mm
focal length ($f_2$) of second lens group $G_{12}$=9.696 mm
$|f_1/f_2|$=0.85
(Values for Conditional Expression 2)
Abbe number ($υd_{22}$) with respect to d-line of second lens $L_{122}$ of second lens group $G_{12}$=81.60
(Values for Conditional Expression 3)
Abbe number ($υd_{14}$) with respect to d-line of fourth lens $L_{114}$ of first lens group $G_{11}$=17.98
(Values for Conditional Expression 4)
Abbe number with respect to d-line of third lens $L_{123}$ of second lens group $G_{12}$ ($υd_{23}$)=23.78
$r_1$=25.7805
    $d_1$=0.90 $nd_1$=1.90366 $υd_1$=31.31
$r_2$=6.6728
    $d_2$=4.80
$r_3$=−19.4704
    $d_3$=0.60 $nd_2$=1.83481 $υd_2$=42.71
$r_4$=367.5043
    $d_4$=−0.10
$r_5$=20.4895
    $d_5$=0.60 $nd_3$=1.83481 $υd_3$=42.71
$r_6$=11.0361
    $d_6$=2.16 $nd_4$=1.94595 $υd_4$=17.98
$r_7$=44.4532
    $d_7$=12.47 (wide angle edge) to 2.46 (telephoto edge)
$r_8$=∞ (diaphragm)
    $d_8$=7.56 (wide angle edge) to 1.03 (telephoto edge)
$r_9$=8.2782 (aspheric surface)
    $d_9$=3.49 $nd_5$=1.61881 $υd_5$=63.85
$r_{10}$=−31.8961 (aspheric surface)
    $d_{10}$=0.10
$r_{11}$=8.2786
    $d_{11}$=3.94 $nd_6$=1.49700 $υd_6$=81.60
$r_{12}$=−25.7145
    $d_{12}$=0.60 $nd_7$=1.84666 $υd_7$=23.78
$r_{13}$=6.0000
    $d_{13}$=1.85
$r_{14}$=8.0000 (aspheric surface)
    $d_{14}$=1.96 $nd_8$=1.80610 $υd_8$=40.73
$r_{15}$=244.3707 (aspheric surface)
    $d_{15}$=1.00 (wide angle edge) to 7.53 (telephoto edge) $r_{16}$=∞
    $d_{16}$=1.20 $nd_9$=1.51633 $υd_9$=64.14
$r_{17}$=∞
    $d_{17}$=3.43
$r_{18}$=∞ (image plane)
conic constant (K) and aspheric coefficients (A, B, C, D)
(Ninth Surface)
K=−0.703385,
A=2.645268×10$^{-6}$, B=5.17270×10$^{-6}$,
C=−3.028016×10$^{-7}$, D=5.896640×10$^{-9}$
(Tenth Surface)
K=3.048316,
A=1.696927×10$^{-4}$, B=1.263759×10$^{-6}$,
C=−2.526369×10$^{-7}$, D=6.185531×10$^{-9}$
(Fourteenth Surface)
K=−0.501755,
A=6.203201×10$^{-4}$, B=−6.066378×10$^{-5}$,
C=4.714249×10$^{-6}$, D=−2.207590×10$^{-7}$
(Fifteenth Surface)
K=30.000000,
A=1.035475×10$^{-3}$, B=−6.398933×10$^{-5}$,
C=4.890914×10$^{-6}$, D=−2.372387×10$^{-7}$ FIG. 2 is a schematic of spherical aberration, astigmatism, and distortion at the wide angle edge of the zoom lens according to the first example. FIG. 3 is a schematic of spherical aberration, astigmatism, and distortion at the telephoto edge of the zoom lens according to the first example. "Fno" in the figures indicates the F number, while "2ω" indicates the angle of view. "ΔS" and "ΔM" depicted in the figures with respect to astigmatism respectively indicate aberration with respect to the sagittal image plane and meridional image plane.

Figure 4:
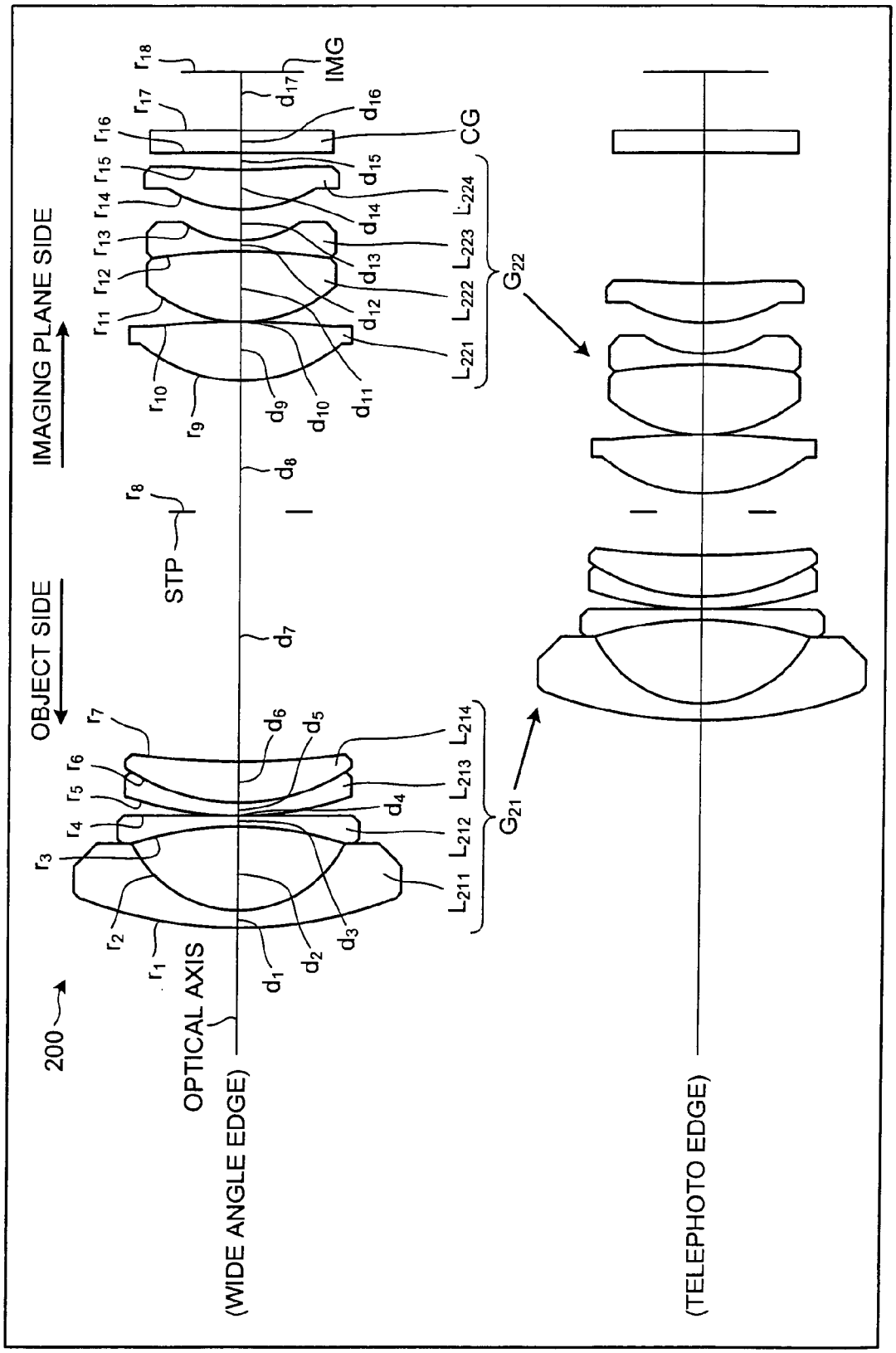
FIG. 4 is a side view, along the optical axis, of a zoom lens according to a second example.

FIG. 4 is a side view, along the optical axis, of a zoom lens according to a second example. A zoom lens 200 includes, sequentially from the object side (not depicted), a first lens group $G_{21}$ having a negative refractive power and a second lens group $G_{22}$ having a positive refractive power. Between the first lens group $G_{21}$ and the second lens group $G_{22}$, a diaphragm STP is disposed. Between the second lens group $G_{22}$ and an image plane IMG, a cover glass CG is disposed. At the image plane IMG, the light receiving aspect of an imaging element, such as a CCD and a CMOS, is disposed.

The zoom lens 200 performs magnification from a wide angle edge to a telephoto edge by moving the second lens group $G_{22}$ along the optical axis toward the object side and performs magnification and image plane correction by moving the first lens group $G_{21}$ along the optical axis toward the image plane IMG side. Further, focusing is performed by moving the first lens group $G_{21}$ along the optical axis.

The first lens group $G_{21}$ includes, sequentially from the object side, a first lens $L_{211}$ that is a negative meniscus lens, a second lens $L_{212}$ that is negative, a third $L_{213}$ lens that is negative, and a fourth $L_{214}$ lens that is positive, where the third lens $L_{213}$ and the fourth $L_{214}$ lens are cemented together.

The second lens group $G_{22}$ includes, sequentially from the object side, a first lens $L_{221}$ that is positive, a second lens $L_{222}$ that is positive, a third lens $L_{223}$ that is negative, and a fourth lens $L_{224}$ that is positive. Both surfaces of the first lens $L_{221}$ are aspheric. The second lens $L_{222}$ and the third lens $L_{223}$ are cemented together. Further, both surfaces of the fourth lens $L_{224}$ are aspheric.

Various numeric data for the zoom lens according to the second example will be described herein.
focal length (f)=3.10 mm (wide angle edge) to
8.70 mm (telephoto edge)
F number=1.25 (wide angle edge) to 2.12 (telephoto edge)
angle of view (2ω)=132.5° (wide angle edge) to 43.3° (telephoto edge)
(Values for Conditional Expression 1)
focal length ($f_1$) of first lens group $G_{21}$=−8.937 mm
focal length ($f_2$) of second lens group=9.407 mm
$|f_1/f_2|$=0.95
(Values for Conditional Expression 2)
Abbe value ($υd_{22}$) with respect to d-line of second lens $L_{222}$ of second lens group $G_{22}$=81.60
(Values for Conditional Expression 3)
Abbe value ($υd_{14}$) with respect to d-line of fourth lens $L_{214}$ of first group $G_{21}$=17.98
(Values for Conditional Expression 4)
Abbe value ($υd_{23}$) with respect to d-line of third lens $L_{223}$ of second lens group $G_{22}$=23.78
$r_1$=25.4047
    $d_1$=0.90 $nd_1$=1.90366 $υd_1$=31.31
$r_2$=6.7988
    $d_2$=4.64
$r_3$=−18.4890
    $d_3$=0.60 $nd_2$=1.83481 $υd_2$=42.71
$r_4$=−359.3822
    $d_4$=0.10

Figure 5:
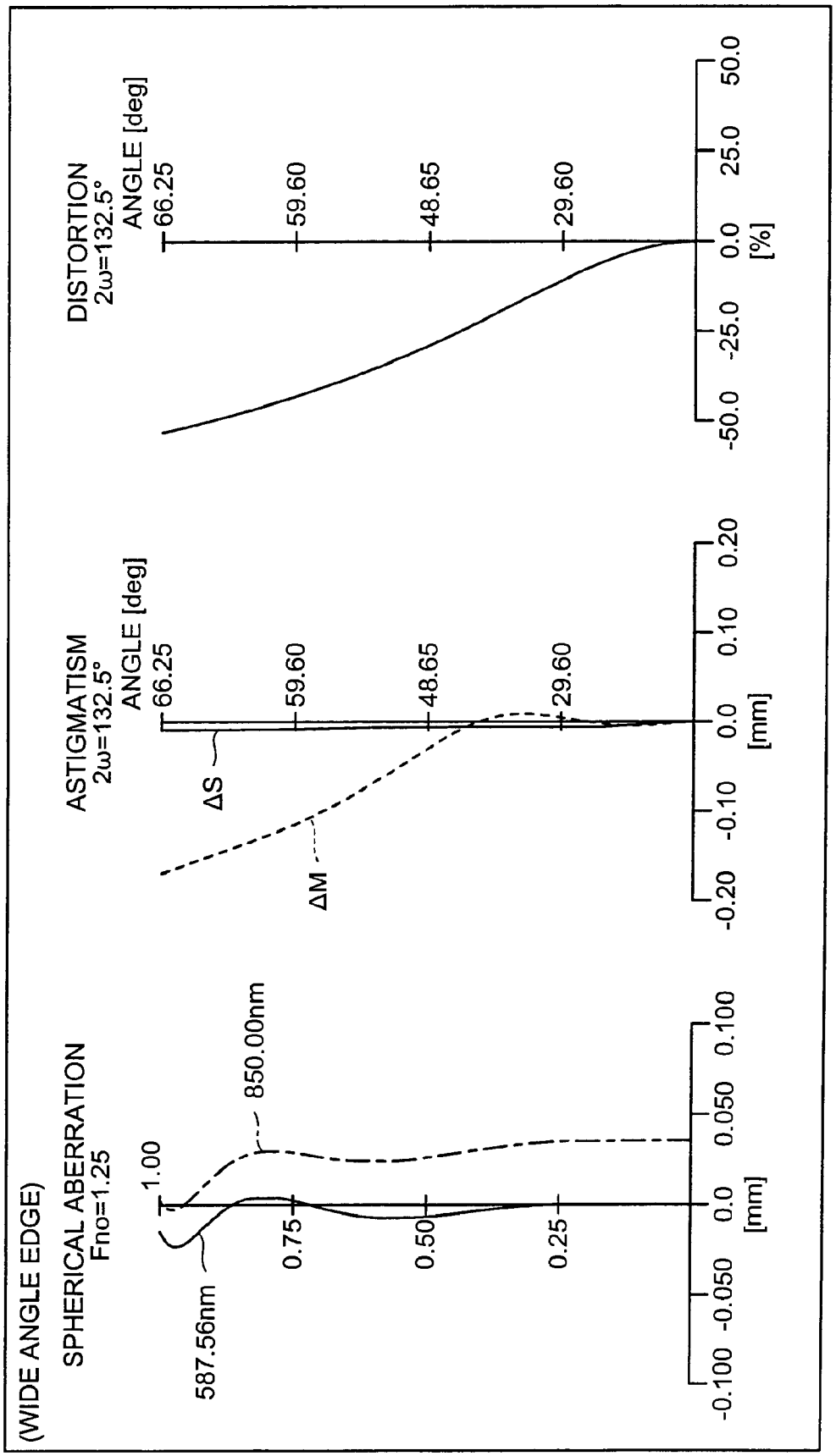
FIG. 5 is a schematic of spherical aberration, astigmatism, and distortion at the wide angle edge of the zoom lens according to the second example.
Figure 6:
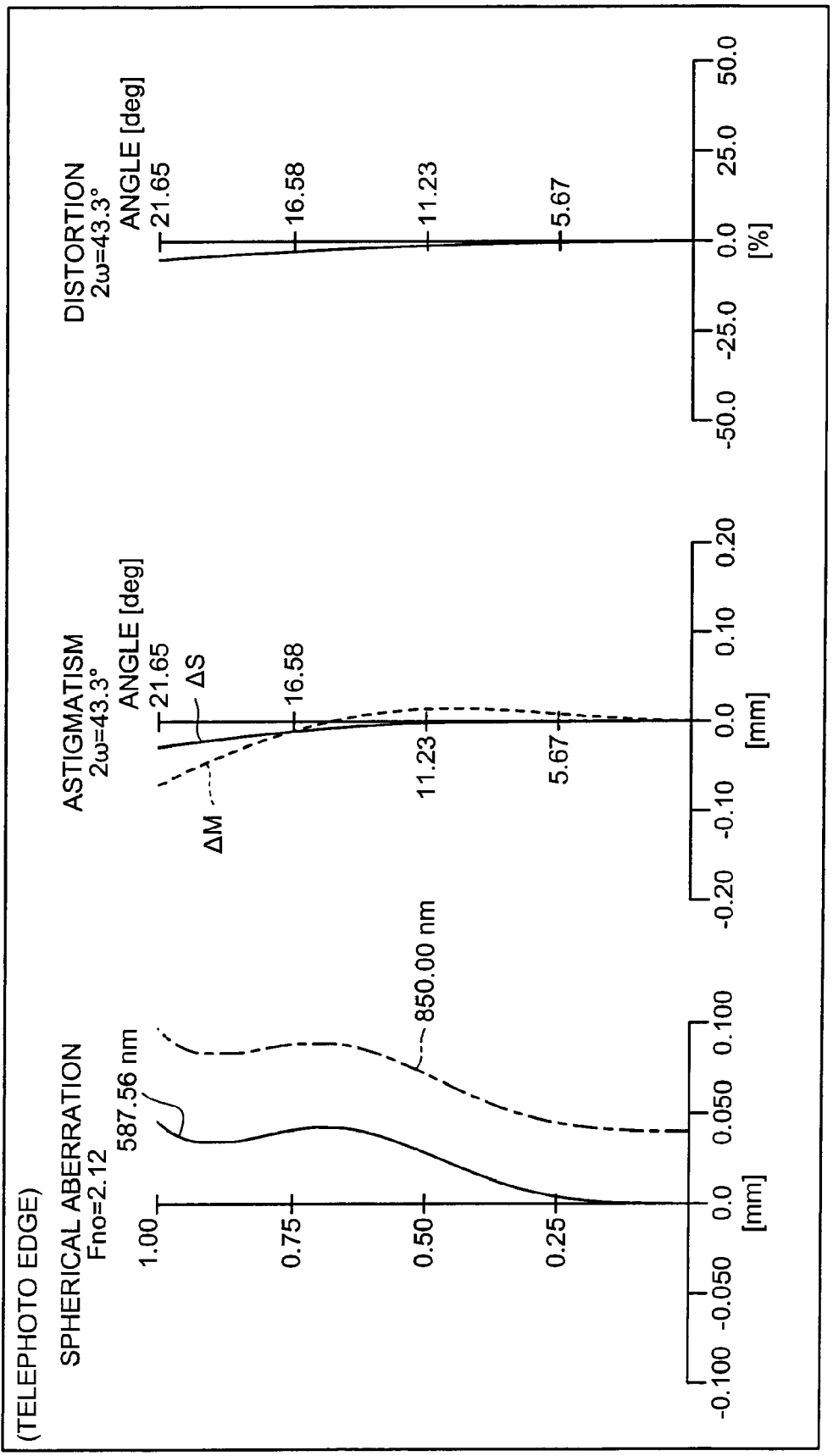
FIG. 6 is a schematic of spherical aberration, astigmatism, and distortion at the telephoto edge of the zoom lens according to the second example.

$r_5=22.4990$
$\quad d_5=0.60$ $nd_3=1.83481$ $\upsilon d_3=42.71$
$r_6=11.8579$
$\quad d_6=2.28$ $nd_4=1.94595$ $\upsilon d_4=17.98$
$r_7=60.1927$
$\quad d_7=13.95$ (wide angle edge) to 2.31 (telephoto edge)
$r_8=\infty$ (diaphragm)
$\quad d_8=6.81$ (wide angle edge) to 1.00 (telephoto edge)
$r_9=8.0019$ (aspheric surface)
$\quad d_9=3.19$ $nd_5=1.61881$ $\upsilon d_5=63.85$
$r_{10}=-44.6631$ (aspheric surface)
$\quad d_{10}=0.16$
$r_{11}=7.5680$
$\quad d_{11}=3.35$ $nd_6=1.49700$ $\upsilon d_6=81.60$
$d_{12}=0.60$ $nd_7=1.84666$ $\upsilon d_7=23.78$
$\quad d_{13}=1.59$ $r_{14}=7.7031$ (aspheric surface)
$\quad d_{14}=2.31$ $nd_8=1.80610$ $\upsilon d_8=40.73$
$r_{15}=86.3291$ (aspheric surface)
$\quad d_{15}=1.00$ (wide angle edge) to 6.89 (telephoto edge)
$r_{16}=\infty$
$\quad d_{16}=1.20$ $nd_9=1.51633$ $\upsilon d_9=64.14$
$d_{17}=3.48$
$\quad r_{18}=\infty$ (image plane)
conic constant (K) and aspheric coefficients (A, B, C, D)
(Ninth Surface)
K=−0.630905,
A=2.764009×10$^{-5}$, B=4.840536×10$^{-6}$,
C=−3.045960×10$^{-7}$, D=5.989457×10$^{-9}$
(Tenth Surface)
K=−0.974950,
A=1.827991×10$^{-4}$, B=5.832139×10$^{-7}$,
C=−2.698910×10$^{-7}$, D=6.609987×10$^{-9}$
(Fourteenth Surface)
K=−0.622646,
A=5.734649×10$^{-4}$, B=−5.450917×10$^{-5}$,
C=4.702484×10$^{-6}$, D=−2.464128×10$^{-7}$
(Fifteenth Surface)
K=17.165964,
A=1.003968×10$^{-3}$, B=−5.307516×10$^{-5}$,
C=4.791478×10$^{-6}$, D=−2.778915×10$^{-7}$ FIG. 5 is a schematic of spherical aberration, astigmatism, and distortion at the wide angle edge of the zoom lens according to the second example. FIG. 6 is a schematic of spherical aberration, astigmatism, and distortion at the telephoto edge of the zoom lens according to the second example. "Fno" in the figures indicates the F number, while "2ω" indicates the angle of view. "ΔS" and "ΔM" depicted in the figures with respect to astigmatism respectively indicate aberration with respect to the sagittal image plane and meridional image plane.

In the numeric data above, $r_1$, $r_2$, ... denote curvature of a lens, etc.; $d_1$, $d_2$, ... denote a thickness of a lens, etc., or a distance between lenses; $nd_1$, $nd_2$, ... denote a refractive index of a lens at the d line; $\upsilon d_1$, $\upsilon d_2$, ... denote the Abbe number of a lens at the d line.

Further, each of the above aspheric surfaces may be expressed by equation 1 below, where with respect to the vertex as a point of reference, y is the height perpendicular to the optical axis, Z(y) is the change in y along the direction of optical axis.

$$Z(y) = \frac{y^2}{R\left(1 + \sqrt{1 - (1+K)y/R^2}\right)^2} + Ay^4 + By^6 + Cy^8 + Dy^{10} \quad (1)$$

Where, R denotes paraxial radii of curvature, K denotes a conic constant, and A, B, C, D are aspheric coefficients of the fourth, sixth, eighth, and tenth power, respectively.

As explained, the zoom lens according to the embodiment has the characteristics described above enabling the zoom lens to be compact and to have a wide angle, a large diameter as well as high optical performance capable of coping with megapixel imaging elements. The zoom lens has an angle of view of 100° or more at the wide angle edge, an F number on the order of 1.2 or more, and can sufficiently correct various types of aberration throughout the spectrum from visible light (wavelength: 587.56 nm) to near infrared light (wavelength: 850.00 nm). Thus, the zoom lens is optimal for monitoring cameras performing approximately 3-fold magnification. Further, the zoom lens includes a lens having a suitable aspheric surface, thereby enabling effective correction of various types of aberration using a small number of lens as well as enabling reductions in the size, weight, and manufacturing cost of the zoom lens.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2008-208490 filed in Japan on Aug. 13, 2008.

What is claimed is:

1. A zoom lens comprising sequentially from an object side:
   a first lens group having a negative refractive power; and
   a second lens group having a positive refractive power,
   wherein focal length of the zoom lens is varied by changing a distance between the first lens group and the second lens group,
   wherein a first conditional expression $0.8<|f_1/f_2|<1.0$ is satisfied, $f_1$ being the focal length of the first lens group and $f_2$ being the focal length of the second lens group,
   wherein the second lens group includes, sequentially from the object side:
   a first lens that is positive and has at least one aspheric surface,
   a second lens,
   a third lens, and
   a fourth lens that is positive and has at least one aspheric surface,
   wherein the second lens of the second lens group is positive,
   wherein the third lens of the second lens group is negative and cemented with the second lens of the second lens group, and
   wherein a second expression $\upsilon d_{22}>68$ is satisfied, $\upsilon d_{22}$ being an Abbe number with respect to d-line of the second lens of the second lens group.

2. The zoom lens according to claim 1, wherein the first lens group includes, sequentially from the object side:
   a first lens that is a negative meniscus lens, a second lens that is negative,
   a third lens that is negative, and
   a fourth lens that is positive and cemented with the third lens of the first lens group.

3. The zoom lens according to claim 2, wherein a third conditional expression $\upsilon d_{14}<25$ is satisfied, $\upsilon d_{14}$ being an Abbe number with respect to d-line of the fourth lens of the first lens group.

4. The zoom lens according to claim 1, wherein a fourth conditional expression $\upsilon d_{23} < 25$ is satisfied, $\upsilon d_{23}$ being an Abbe number with respect to d-line of the third lens of the second lens group.

5. The zoom lens according to claim 1, wherein the second lens group is moved along an optical axis toward the object side to perform magnification from a wide angle edge to a telephoto edge, and wherein the first lens group is moved along the optical axis toward an image side to perform magnification and image plane correction.

* * * * *